US009294982B2

(12) United States Patent
Srivastava et al.

(10) Patent No.: US 9,294,982 B2
(45) Date of Patent: Mar. 22, 2016

(54) SYSTEM AND METHOD FOR ROBUST MULTIPLE ACCESS NETWORK MOBILITY IN A NETWORK ENVIRONMENT

(71) Applicant: CISCO TECHNOLOGY, INC., San Jose, CA (US)

(72) Inventors: Vimal Srivastava, Bangalore (IN); Rajeev Koodli, Saratoga (IN); Armin Kasum, Southborough, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 124 days.

(21) Appl. No.: 14/165,248

(22) Filed: Jan. 27, 2014

(65) Prior Publication Data
US 2015/0215836 A1 Jul. 30, 2015

(51) Int. Cl.
| | | |
|---|---|---|
| *H04W 36/22* | (2009.01) | |
| *H04W 36/00* | (2009.01) | |
| *H04W 76/02* | (2009.01) | |
| H04W 88/06 | (2009.01) | |
| H04W 36/14 | (2009.01) | |

(52) U.S. Cl.
CPC .......... *H04W 36/22* (2013.01); *H04W 36/0011* (2013.01); *H04W 76/026* (2013.01); *H04W 36/14* (2013.01); *H04W 88/06* (2013.01)

(58) Field of Classification Search
CPC .................................................... H04W 36/22
See application file for complete search history.

(56) References Cited

U.S. PATENT DOCUMENTS

| | | | |
|---|---|---|---|
| 2002/0160777 A1* | 10/2002 | Takao .................. | H04W 36/12 455/436 |
| 2009/0245202 A1 | 10/2009 | Gras et al. | |
| 2009/0258649 A1* | 10/2009 | Salowey ................ | H04W 4/02 455/435.2 |
| 2011/0176417 A1* | 7/2011 | Kuwabara ............. | H04W 36/22 370/230 |
| 2011/0305220 A1 | 12/2011 | Lindoff et al. | |
| 2012/0258674 A1 | 10/2012 | Livet et al. | |

(Continued)

OTHER PUBLICATIONS

European Telecommunications Standard Institute, "Universal Mobile Telecommunications System (UMTS); LTE; IP flow mobility and seamless Wireless Local Area Network (WLAN) offload; Stage 2, (3GPP TS 23.261 version 11.0.0.0 Release 11)," Sep. 2012, 8 pages.

(Continued)

*Primary Examiner* — Hassan Kizou
*Assistant Examiner* — Ashil Farahmand
(74) *Attorney, Agent, or Firm* — Patent Capital Group

(57) ABSTRACT

An example method is provided in one example embodiment and includes establishing a mobility context associated with a user equipment that includes a designation of a first radio access network as a primary access network and a second radio access network as a secondary access network. The method further includes defining an initial value for a data count variable representative of a number of consecutive uplink packets associated with the user equipment received over the first radio access network. The method further includes receiving at least one first uplink packet associated with the user equipment from at least one of the first radio access network and the second radio access network, modifying a value of the data count variable when the first uplink packet is received over the second radio access network, setting the value of the data count variable to the initial value of the data count variable when the first uplink packet is received over the first radio access network, and modifying the mobility context if the value of the data count variable is equal to a predetermined value.

22 Claims, 6 Drawing Sheets

(56) References Cited

U.S. PATENT DOCUMENTS

| | | | |
|---|---|---|---|
| 2013/0021968 A1* | 1/2013 | Reznik | H04W 36/026 370/328 |
| 2013/0070596 A1 | 3/2013 | Yeh et al. | |
| 2013/0094475 A1 | 4/2013 | Song | |
| 2013/0208605 A1 | 8/2013 | Bautista et al. | |
| 2013/0322300 A1 | 12/2013 | Landais et al. | |
| 2014/0064068 A1 | 3/2014 | Horn et al. | |
| 2014/0254498 A1 | 9/2014 | Mueck et al. | |
| 2015/0043349 A1* | 2/2015 | Zhu | H04W 48/18 370/235 |
| 2015/0215795 A1* | 7/2015 | Zhu | H04L 43/062 370/252 |

OTHER PUBLICATIONS

Wikipedia, the free encyclopedia, "System Architecture Evolution," last modified Aug. 23, 2013; retrieved and printed on Jan. 27, 2014, 24 pages; http://en.wikipedia.org/wiki/System_Architecture_Evolution.

U.S. Appl. No. 14/538,334, filed Nov. 11, 2014, entitled "System and Method for Providing Internet Protocol Flow Mobility in a Network Environment," Inventors: Paras Jain, et al.

U.S. Appl. No. 14/540,082, filed Nov. 13, 2014, entitled "System and Method for Providing Internet Protocol Flow Mobility in a Network Environment," Inventors: Paras Jain, et al.

Hakala, et al., "Diameter Credit-Control Application," Network Working Group, RFC 4006, Aug. 2005, 119 pages; http://www.ietf.org/rfc/rfc4006.txt.

Bernardos, "Proxy Mobile IPv6 Extensions to Support Flow Mobility," NETEXT Working Group, Internet-Draft, Intended status: Standards Track, Expires: Jan. 24, 2015, Jul. 2014, 22 pages; http://tools.ietf.org/html/draft-ietf-netext-pmipv6-flowmob-11.

"ETSI TS 123 261 V12.0.0 (Sep. 2014) Technical Specification: Universal Mobile Telecommunications System (UMTS); LTE; IP flow mobility and seamless Wireless Local Area Network (WLAN) offload; Stage 2 (3GPP TS 23.261 version 12.0.0 Release 12)," European Telecommunications Standards Institute (ETSI), 650 Route des Lucioles, F-06921 Sohia Antipolis Cedex-France, Sep. 2014; 24 pages.

"ETSI TS 129 212 V12.6.0 (Oct. 2014) Technical Specification: Universal Mobile Telecommunications System (UMTS); LTE; Policy and Charging Control (PCC); Reference points (3GPP TS 29.212 version 12.6.0 Release 12)," European Telecommunications Standards Institute (ETSI), 650 Route des Lucioles, F-06921 Sohia Antipolis Cedex-France, Oct. 2014; [See Section 4.3.1, pp. 19-21 and Section 5.3.31, p. 113]; 23 pages.

\* cited by examiner

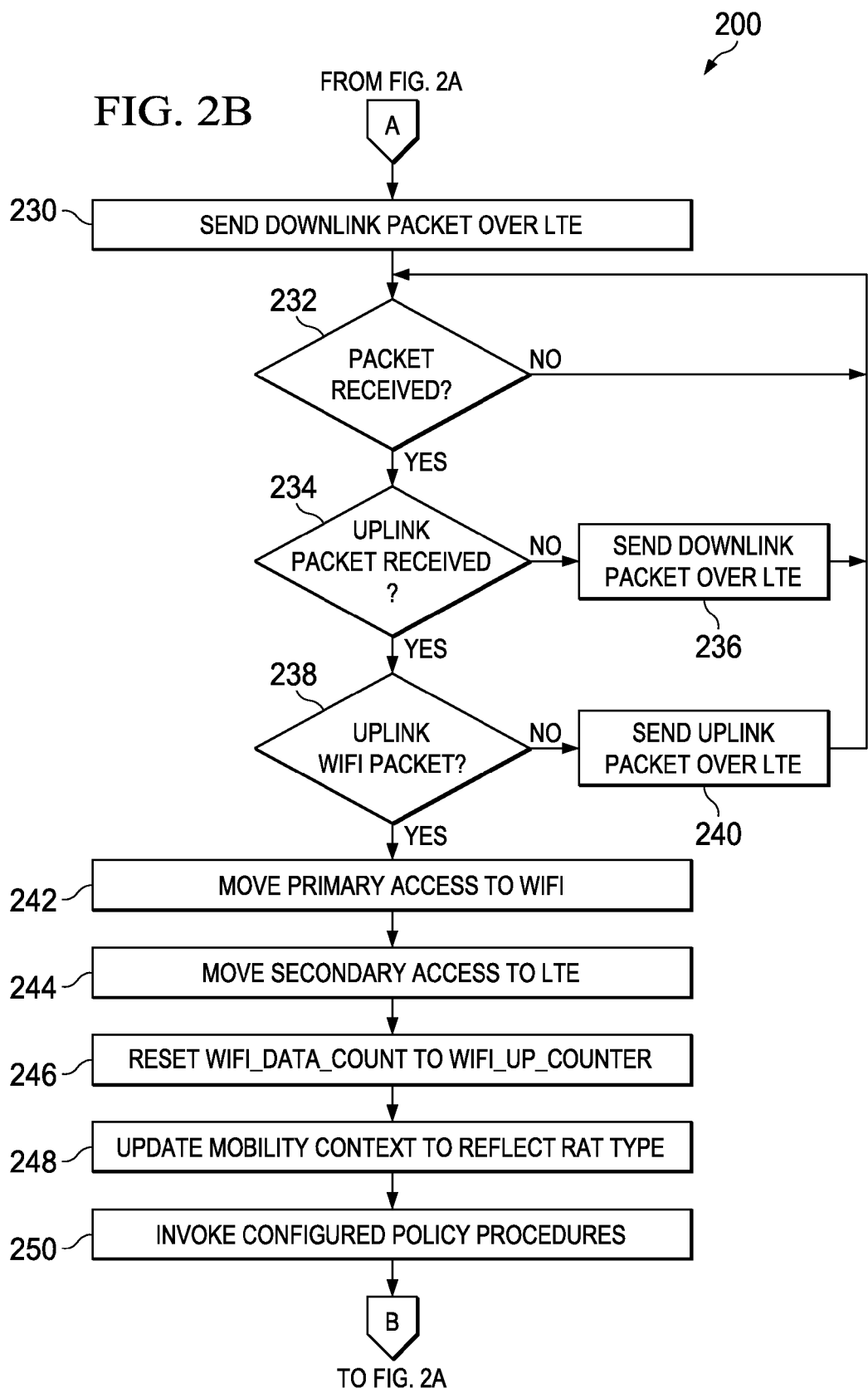

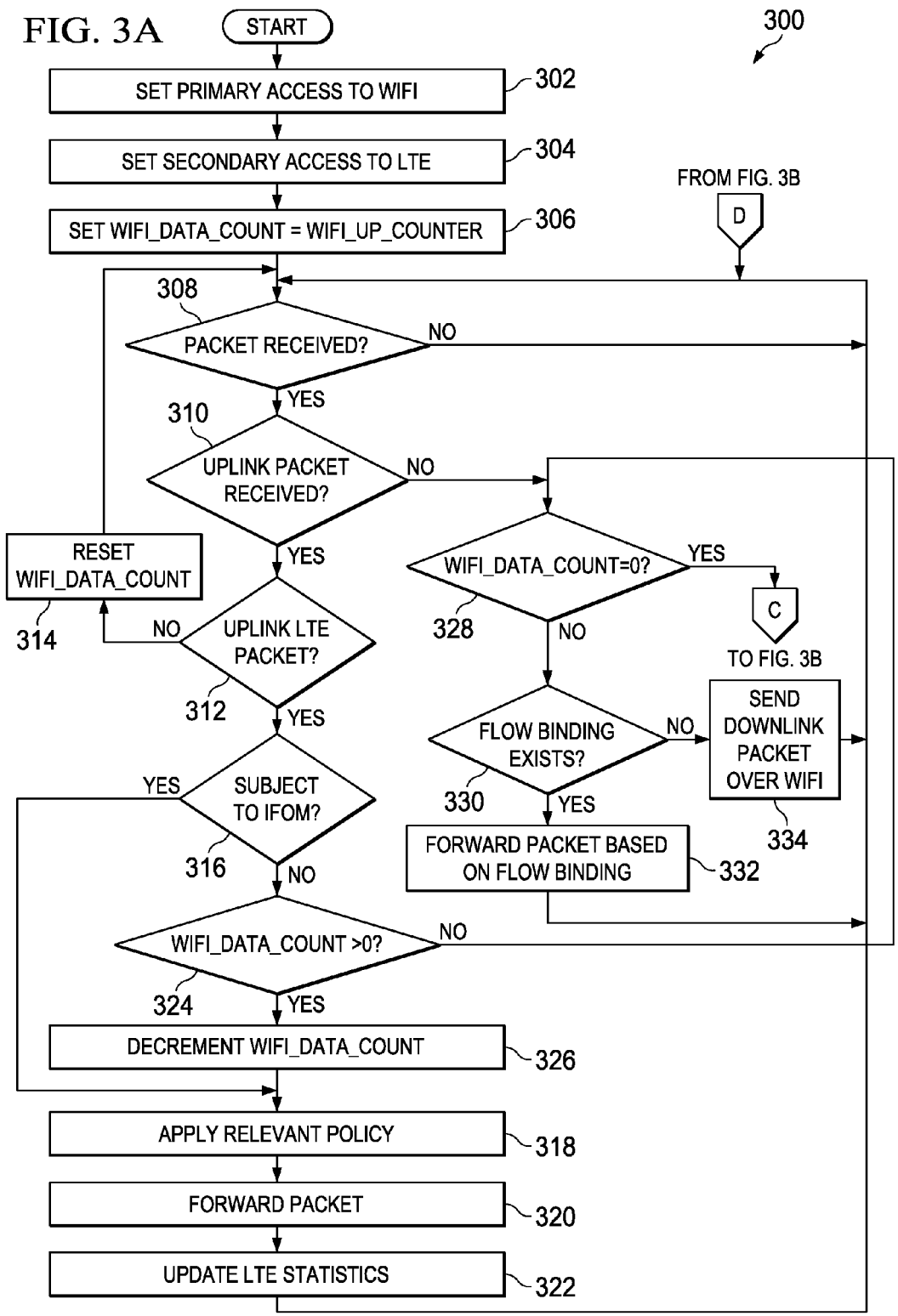

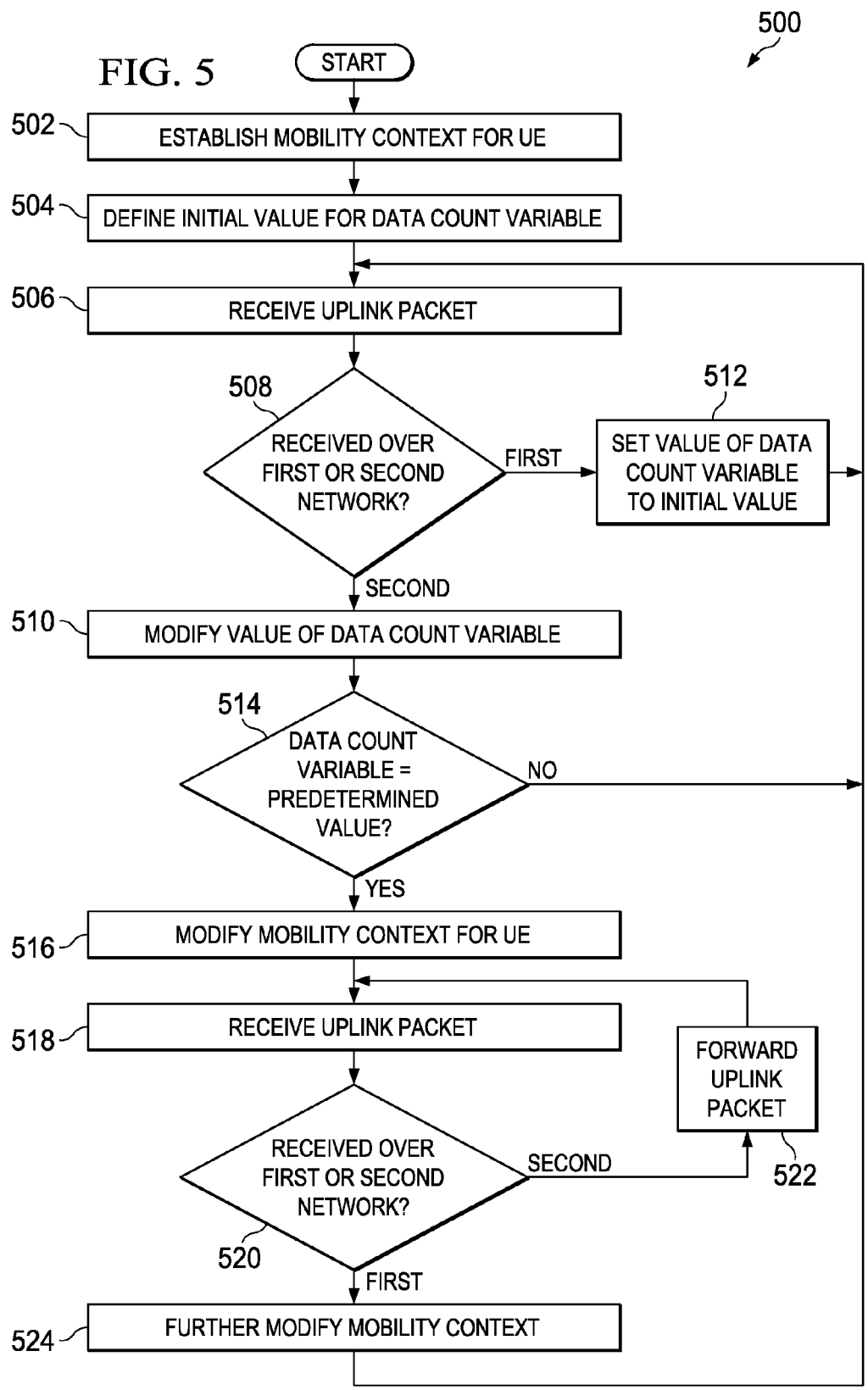

US 9,294,982 B2

SYSTEM AND METHOD FOR ROBUST MULTIPLE ACCESS NETWORK MOBILITY IN A NETWORK ENVIRONMENT

TECHNICAL FIELD

This disclosure relates in general to the field of communications and, more particularly, to a system and method for robust multiple access network mobility in a network environment.

BACKGROUND

Networking architectures have grown increasingly complex in communication environments. For example, network providers have developed architectures in which the provider includes both mobile networks and Wi-Fi networks that are each accessible from user equipment having multi-mode capability. In some situations, the network provider may allow user equipment to connect simultaneously to both the mobile and Wi-Fi networks. In still other situations, the network provider may prefer to offload traffic associated with the mobile network to the Wi-Fi network in order to conserve the more costly bandwidth of the mobile network. In such situations, the user equipment may be configured to handover from the mobile network to the Wi-Fi network when the user equipment is determined to be within range of a Wi-Fi access point. However, there are significant challenges in managing mobility of user equipment within mobile and Wi-Fi networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2B are a simplified flow diagram illustrating example operations associated with robust handover for robust multiple access network mobility in one example embodiment of the communication system;

FIGS. 3A-3B are a simplified flow diagram illustrating example operations associated with IP flow mobility for robust multiple access network mobility in another example embodiment of the communication system;

FIG. 5 is a simplified flow diagram illustrating another example operation of the communication system in accordance with another embodiment.

DETAILED DESCRIPTION OF EXAMPLE EMBODIMENTS

Overview

Figure 1:
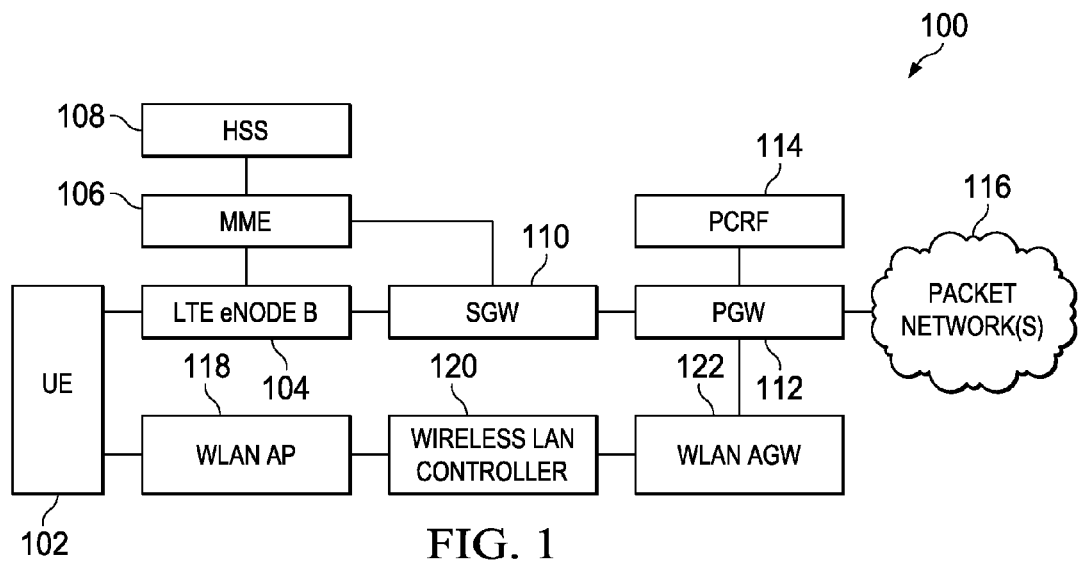
FIG. 1 is a simplified block diagram of a communication system for robust multiple access network mobility in a network environment in accordance with one embodiment of the present disclosure.

An example method is provided in one example embodiment and includes establishing a mobility context associated with a user equipment that includes a designation of a first radio access network as a primary access network and a second radio access network as a secondary access network. The method further includes defining an initial value for a data count variable representative of a number of consecutive uplink packets associated with the user equipment received over the first radio access network. The method further includes receiving at least one first uplink packet associated with the user equipment from at least one of the first radio access network and the second radio access network, modifying a value of the data count variable when the first uplink packet is received over the second radio access network, setting the value of the data count variable to the initial value of the data count variable when the first uplink packet is received over the first radio access network, and modifying the mobility context if the value of the data count variable is equal to a predetermined value.

In more specific embodiments, modifying the mobility context includes designating the second radio access network as the primary access network for the user equipment, and designating the first radio access network as the secondary access network for the user equipment. In other specific embodiments, the method further includes receiving a second uplink packet associated with the user equipment from at least one of the first radio access network and the second radio access network, and determining whether the second packet is received over the first radio access network or the second radio access network. In still other specific embodiments, the method further includes forwarding the second uplink packet when the second uplink packet is received over the second radio access network.

In other specific embodiments, the method further includes further modifying the mobility context of the user equipment when the second uplink packet is received over the first radio access network. In still other specific embodiments, further modifying the mobility context further includes designating the first radio access network as the primary access network for the user equipment, and designating the second radio access network as the secondary access network for the user equipment.

In still other specific embodiments, modifying the value of the data count variable includes decrementing the value of the data count variable. In still other specific embodiments, the method further includes receiving a downlink packet associated with the user equipment, and forwarding the downlink packet over the first radio access network when the first radio access network is designated as the primary access. In other specific embodiments, the method further includes receiving a downlink packet associated with the user equipment, and forwarding the downlink packet over the second radio access network when the second radio access network is designated as the primary access.

In other specific embodiments, the second radio access network is a mobile network such as a 4G LTE network or 3G UMTS or 3G CDMA network. In other specific embodiments, the first radio access network is a wireless local area network (WLAN). In other specific embodiments, each of the first access network and second access network are configured to simultaneously act as a primary access network and secondary access network depending on the type of packet to be forwarded to the user equipment. In still other specific embodiments, a first class of applications are supported over the first access network and a second class of applications are supported over the second access network, wherein the first class of applications and the second class of application are associated with the same packet data network (PDN) connection.

An example non-transitory tangible media encoding logic includes instructions for execution that, when executed by a processor, is operable to perform operations comprising establishing a mobility context associated with a user equipment, wherein the mobility context includes a designation of a first radio access network as a primary access network and a second radio access network as a secondary access network, and defining an initial value for a data count variable, wherein the data count variable is representative of a number of consecutive uplink packets associated with the user equipment received over the first radio access network. The operations further include receiving at least one first uplink packet associated with the user equipment from at least one of the first radio access network and the second radio access network, modifying a value of the data count variable when the first uplink packet is received over the second radio access network, setting the value of the data count variable to the initial value of the data count variable when the first uplink packet is received over the first radio access network, and modifying the mobility context if the value of the data count variable is equal to a predetermined value.

An example apparatus includes a memory element for storing data, and a processor that executes instructions associated with the data. The processor and memory element cooperate such that the apparatus is configured for establishing a mobility context associated with a user equipment, wherein the mobility context includes a designation of a first radio access network as a primary access network and a second radio access network as a secondary access network, and defining an initial value for a data count variable, wherein the data count variable is representative of a number of consecutive uplink packets associated with the user equipment received over the first radio access network. The apparatus is further configured for receiving at least one first uplink packet associated with the user equipment from at least one of the first radio access network and the second radio access network, modifying a value of the data count variable when the first uplink packet is received over the second radio access network, setting the value of the data count variable to the initial value of the data count variable when the first uplink packet is received over the first radio access network, and modifying the mobility context if the value of the data count variable is equal to a predetermined value.

Example Embodiments

Referring now to FIG. 1, FIG. 1 is a simplified block diagram of a communication system 100 for robust multiple access network mobility in a network environment in accordance with one embodiment of the present disclosure. FIG. 1 includes user equipment (UE) 102, a long term evolution (LTE) evolved Node B (eNodeB) 104, a mobile management entity (MME) 106, a home subscriber server (HSS) 108, a serving gateway (SGW) 110, a packet data network (PDN) gateway (PGW) 112, a policy and charging rules function (PCRF) 114, one or more packet network 116, a wireless local area network (WLAN) access point (AP) 118, a wireless LAN controller (WLC) 120, and WLAN access gateway (AGW) 122.

In at least one embodiment, UE 102 is a mobile device having multi-mode capabilities and is able to simultaneously communicate with LTE eNodeB 104 using one or more mobile wireless connections such as LTE connections and communicate with WLAN AP 118 using one or more wireless LAN connections such as Wi-Fi connections. In accordance with various embodiments, UE 102 may include a computer (e.g., notebook computer, laptop, tablet computer or device), a tablet, a cell phone, a personal digital assistant (PDA), a smartphone, or any other suitable device having the capability to communicate using multiple access technologies. LTE eNodeB 104 is further communication with MME 106. Among other things, MME 106 provides tracking area list management, idle mode UE tracking, bearer activation and deactivation, serving gateway and packet data network gateway selection for UEs and authentication services. MME 106 is in communication with HSS 108 which includes a database that contains user-related and subscription-related information. HSS 108 may perform functionalities such as mobility management, call and session establishment support, user authentication and access authorization.

LTE eNodeB 104 and MME 106 are in further communication with SGW 110. SGW 110 routes and forwards user data packets, while also acting as the mobility anchor for the user plane during inter-eNodeB handovers and as the anchor for mobility between LTE and other 3GPP technologies. SGW 110 is in further communication with PGW 112. PGW 112 provides connectivity from UE 102 to external packet data network(s) 116 by being the point of exit and entry of traffic for UE 102. PGW 112 is in further communication with PCRF 114. PCRF 114 aggregates information to and from the network, operational support systems, and other sources (such as portals) in real time, supporting the creation of rules and then automatically making policy decisions for each subscriber such as quality of service (QoS) levels, and charging rules.

WLAN AP 118 is in further communication with WLC 120. WLC 120 may be responsible for system wide wireless LAN functions, such as security policies, intrusion prevention, RF management, quality of service (QoS), and mobility. WLC 120 is in further communication with WLAN AGW 122. WLAN AGW 122 is in communication with PGW 112 and provides connectivity from UE 102 to external packet data network(s) 116. Although various embodiments are described herein using an LTE access network and a WLAN access network, it should be understood that in other embodiments the principles described herein may be applied to other radio access networks such as 4G/3G, etc.

Before detailing some of the operational aspects of FIG. 1, it is important to understand different scenarios involving LTE-Wi-Fi networking. The following foundation is offered earnestly for teaching purposes only and, therefore should not be construed in any way to limit the broad teachings of the present disclosure. In a multiple access connectivity scenario, user equipment (UE) connects to both LTE and Wi-Fi simultaneously. This results in at least two PDN connections with unique IP addresses for each. Charging and policy procedures are performed for each PDN connection separately. By the 3rd Generation Partnership Project (3GPP) standards definition, multi-access is provided when the access point name (APN) is different for each access. At the time of an attach by the UE, if an APN is different, a separate IP address is assigned. By definition, if the APN is the same, handover is performed (and the IP address preserved), implying that the previous access is considered no longer available.

In a handover scenario, user equipment (UE) may be initially connected to an LTE network and subsequently undergo handover to a Wi-Fi network. Alternately, the user equipment (UE) may initially be connected to the Wi-Fi network and subsequently undergo a handover to LTE. In this situation, the expectation is that the UE's IP address is preserved across handover. The UE is expected to "move" its PDN connection from one access to another as well as provide a handover indication to the network. Charging and policy functions are performed for only one PDN connection. By the 3GPP standards definition, a handover takes place when the APN is the same for the new access as in the previous access. As of Release 11 of the 3GPP standards, handover between LTE and Wi-Fi is not specified, and the UEs do not perform handover operations. The UEs typically maintain connectivity over both of the accesses. A UE may hand-in and hand-out of Wi-Fi frequently, causing traffic to change paths accordingly. It should be noted that PDN handover does not imply relinquishing of the radio access as a UE can be connected to LTE on a different PDN while it moves a PDN from LTE to Wi-Fi.

In an IP Flow Mobility (IFOM) scenario a UE is connected to both the LTE and Wi-Fi accesses simultaneously and select flows are moved from one access to another according to configuration parameters indicated by the network operator. Flow bindings established at the PDN gateway and the UE determine how the packets are routed, taking precedence over assigned IP addresses over the individual interfaces. Charging and policy functions are performed for each PDN connection separately. By 3GPP standards definition, multi-access (with different APNs) is necessary before select flows are moved from one access to another. Accordingly, IFOM is a combination of multi-access and handover. It needs simultaneous multi-access to LTE and Wi-Fi while providing the ability to maintain IP preservation across the access. Only client-based IFOM is specified in the 3GPP standards, and this requires the so-called S2c connectivity which is not used in deployments today.

In current implementations, when an LTE-connected UE attaches to and hands over a PDN connection to Wi-Fi, the PGW replaces the existing LTE PDN (S5) context with the Wi-Fi PDN (S2a) context. This allows the PGW to send and receive packets over Wi-Fi. However, an unmodified UE may reclaim the LTE access and send packets (such as DNS queries, DHCP, etc.) over LTE. This causes the PGW to replace the PDN context back to LTE. In the meanwhile, the UE may send packets over Wi-Fi, which will not be forwarded by the PGW. Furthermore, the process of re-establishing LTE connectivity is exacerbated by first determining the absence of UE PDN context (at the PGW) by the SGW and the MME, and forcing the UE to do re-attach. This may easily add 300-400 milliseconds of delay.

Various embodiments described herein provide for updating a PDN context for UE 102 with an indication of the correct current radio access (e.g., LTE or Wi-Fi) and designating one of the accesses as a primary access, which is used for forwarding both uplink and downlink packets, and the other as a secondary access, which is used only for forwarding uplink packets. Certain embodiments may be extended to IP Flow Mobility (IFOM) scenarios in which the LTE access and the Wi-Fi access may be designated to act as the primary based upon matching flow bindings as designated by the service provider. Accordingly, one or more embodiments may provide robust LTE-Wi-Fi PDN handovers with a single PDN context and provide associated charging functions. In addition, certain embodiments may enable IP Flow Mobility with a single PDN context while co-existing with handover.

In certain embodiments, one or more of the following assumptions may exist: UEs are unmodified an incapable of providing indications such as handover or APN; UEs are capable of handling the same IP address across physical interfaces; UEs send packets with whatever access they deem fit, although in practice, UE implementations do exhibit affinity for prioritizing applications to certain interfaces; and if IFOM is enabled, the UE is configured with flow rules that determine the access type to use for individual flows.

In operation, PGW 112 maintains a single context for UE 102 for the PDN for LTE-Wi-Fi mobility. For instance, PGW 112 maintains a single context for the Internet PDN even if UE 102 is attached to both the LTE network and the Wi-Fi network. The single context is denoted as a "mobility context" henceforth. It should be noted that in certain situations there may be separate PDNs that are not subject to handovers (based on operator policy), and those PDNs may have their own contexts. The mobility context contains primary access and secondary access designations for UE 102. The primary access is the access over which PGW 112 forwards packets in the downlink (DL) to UE 102, and accepts packets in the uplink (UL) from UE 102. The secondary access is the access over which PGW 112 only accepts packets in the uplink, but does not forward packets in the downlink. As will be further described herein, in various embodiments PGW 112 performs an objective function to maximize using Wi-Fi as the primary access while minimizing the disruption caused by UE 102 making frequent hand-in and hand-outs from LTE.

In various embodiments, PGW 112 may be configured to provide robust mobility in one or more handover scenarios in which UE 102 may handover between LTE and Wi-Fi, or between Wi-Fi and LTE. In such scenarios, a network operator determines whether to make a Wi-Fi attach handover, in which case the APN used in LTE is used for Wi-Fi as well. This APN is configured in HSS 108 and is provided to the trusted Wi-Fi Access during UE authentication. During a handover, PGW 112 determines and designates the primary access and secondary access for the mobility context. The following situations related to handover are possible:

1. UE 102 attaches to LTE and no Wi-Fi context exists.
2. UE 102 attaches to Wi-Fi and there is no other context at PGW 112.
3. UE 102 attaches to Wi-Fi and there is already an LTE context for the same PDN.
4. UE 102 (re)attaches to LTE and there is already a Wi-Fi context. The following sub-cases include:
    a) If UL data arrives on the LTE access, it would imply that UE 102 has lost Wi-Fi connectivity and it will mark LTE as the Primary Access, or
    b) UE 102 tries connecting to the LTE network (for whatever reasons), or
    c) UE 102 may send data for a few flows on LTE and a few flows on Wi-Fi (IFOM-like behavior without any explicit signaling).

It is desirable to differentiate between when UE 102 truly moves to LTE (i.e., when Wi-Fi connectivity is not present) compared to UE 102 attaching to LTE even when Wi-Fi connectivity is present for the same PDN.

The table below summarizes the various use cases and desired Primary and Secondary Access for each case in accordance with at least one embodiment.

TABLE 1

| Case | | Primary | Secondary |
|---|---|---|---|
| 1 | UE Attaches to LTE and No Wi-Fi Context exists at PGW | LTE | |
| 2 | UE Attaches to Wi-Fi and no LTE Context exists at PGW | Wi-Fi | |
| 3 | UE Attaches to Wi-Fi and there is an LTE context at PGW | Wi-Fi | LTE |
| 4 | UE (re)attaches to LTE and there is a Wi-Fi context at PGW | | |
| | a. UE is truly in LTE and lost Wi-Fi | LTE | Wi-Fi |
| | b. UE is in Wi-Fi but is also using LTE | Wi-Fi | LTE |

In Cases 1, 2, and 3: PGW 112 may be configured to identify and designate the appropriate access as primary within the mobile context during session establishment. For example, in Case 1 PGW 112 may determine that UE 102 is attached to LTE and that no Wi-Fi context exists at PGW 112 and designate LTE access as the primary access within the mobility context associated with UE 102. In Case 2, PGW 112 may determine that UE 102 is attached to Wi-Fi and that no LTE context exists at PGW 112 and designate Wi-Fi access as the primary access within the mobility context associated with UE 102. In Case 3, PGW 112 may determine that UE 102 attaches to LTE and there is a Wi-Fi context for UE 102 at PGW 112 and designates Wi-Fi access as the primary access and LTE access as the secondary access for UE 102.

In accordance with various embodiments, in Case 4 PGW 112 may be configured to perform a heuristic algorithm for primary access and secondary access designation to provide robust handover as well as other possible benefits as will be further described with respect to FIG. 2.

Figure 2A:
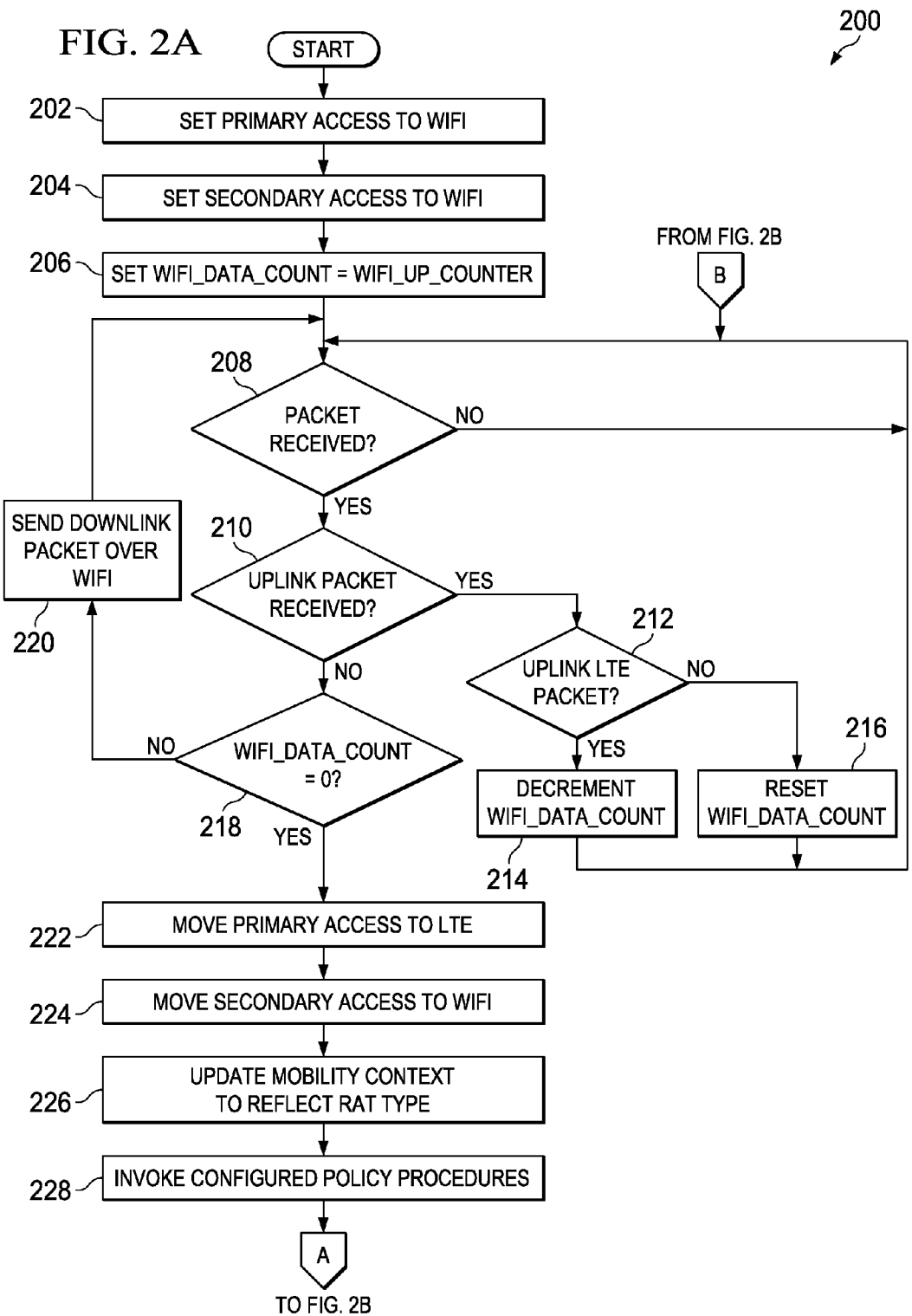

Referring now to FIGS. 2A-2B, FIGS. 2A-2B are a simplified flow diagram 200 illustrating example operations associated with robust handover for robust multiple access network mobility in one example embodiment of communication system 100. The context is what PGW 112 uses to forward traffic and the access is what access technology is attached to the context (such as Wi-Fi, 4G, LTE, etc.). In accordance with various embodiments, PGW 112 maintains a single context, referred to as the mobility context, for UE 102 in which primary access and secondary access is designated. The primary access is what PGW 112 uses to forward traffic associated with UE 102 on both uplink and downlink directions. The secondary context is what PGW 112 uses only to receive packets on the uplink direction. As is understood, uplink packets are packets coming from UE 102 toward PGW 112, and downlink packets are packets sent toward UE 102 from PGW 112.

In 202, PGW 112 sets the primary access to Wi-Fi access for the mobility context associated with UE 102. In 204, PGW 112 sets the secondary access to LTE access for the mobility context associated with UE 102. It should be noted that there is a distinction between the context and access for UE 102. In 206, PGW 112 defines a new variable referred to as wifi_data_count whose initial value is set to a configurable value=WIFI_UP_COUNTER. In a particular example, WIFI_UP_COUNTER is set to an initial value of 10.

In 208, PGW 112 determines whether a packet has been received. If no packet has been received the operations return to 208. If a packet has been received, the operations continue to 210. In 210, PGW 112 determines whether the received packet is an uplink packet. If the received packet is an uplink packet, the operations continue to 212 in which PGW 112 determines whether the uplink packet is an uplink LTE packet. If an UL LTE packet is received, PGW 112 decrements the wifi_data_count by one in 214, forwards the packet, and the operations return to 208. If an uplink LTE packet is not received then the received uplink packet is an UL Wi-Fi packet, and PGW 112 resets wifi_data_count back to the initial value of WIFI_UP_COUNTER in 216, forwards the packet, and operations return to 208.

If it is determined in 210 that the received packet is not an uplink packet then the received packet is a downlink packet and the operations continue to 218. In 218, PGW 112 determines whether wifi_data_count is equal to zero (0). If wifi_data_count is not equal to zero, PGW 112 sends the downlink packet over the Wi-Fi access in 220 and the operations return to 208.

If it is determined in 218 that wifi_data_count equals zero, PGW 112 moves the primary access for UE 102 to LTE access in 222. As a result, UE 102 does not have Wi-Fi connectivity anymore, but does have LTE connectivity. In 224, PGW 112 moves the secondary access for UE 102 to Wi-Fi access. In 226, PGW 112 updates the mobility context for UE 102 to reflect the radio access technology (RAT) Type of primary access of LTE and secondary access of Wi-Fi. In 228, PGW 112 invokes any configured policy procedures for UE 102 such as charging policies or quality of service (QoS) policies. In 230, PGW 112 sends the downlink packet over the LTE access.

In 232, PGW 112 determines whether another packet has been received. If no packet has been received the operations return to 232. If another packet is received, the operations continue to 234 in which PGW 112 determines whether the received packet is an uplink packet. If the received packet is not an uplink packet and is therefore a downlink packet, PGW 112 sends the downlink packet over LTE in 236 and operations return to 232. If the received packet is an uplink packet, the operations continue to 238 in which PGW 112 determines whether the uplink packet is a Wi-Fi packet. If the uplink packet is not a Wi-Fi packet, PGW 112 sends the uplink packet over LTE in 240 and operations return to 232.

If the uplink packet is a Wi-Fi packet, PGW 112 moves primary access for UE 102 to Wi-Fi access in 242. In 244, PGW 112 moves secondary access for UE 102 to LTE access. In 246, PGW 112 resets the value of wifi_data_count to the initial value of WIFI_UP_COUNTER. This implies UE 102 has regained Wi-Fi access. In 248, PGW 112 updates the mobility context for UE 102 to reflect the radio access technology (RAT) Type of primary access of Wi-Fi and secondary access of LTE. In 250, PGW 112 invokes any configured policy procedures for UE 102, forwards the packet, and operations return to 208.

In essence, embodiments of the above described procedure attempts to make the handover between Wi-Fi and LTE robust by favoring Wi-Fi for packet forwarding, and switches over to LTE only when a sufficient number of uplink packets arrive on LTE based on the configuration parameter WIFI_UP_COUNTER. Various embodiments of the above described algorithm assume that UE 102 switches over to LTE when its Wi-Fi connectivity is not working. The algorithm is not intended to address whether there is poor Wi-Fi connectivity itself; specifically, it does not try to detect if Wi-Fi connectivity alone is working or not. Rather in one or more embodiments it is directed to enabling the LTE access only when Wi-Fi connectivity is not working, and avoid context replacement due to spurious or intermittent use of LTE access.

Figure 3B:
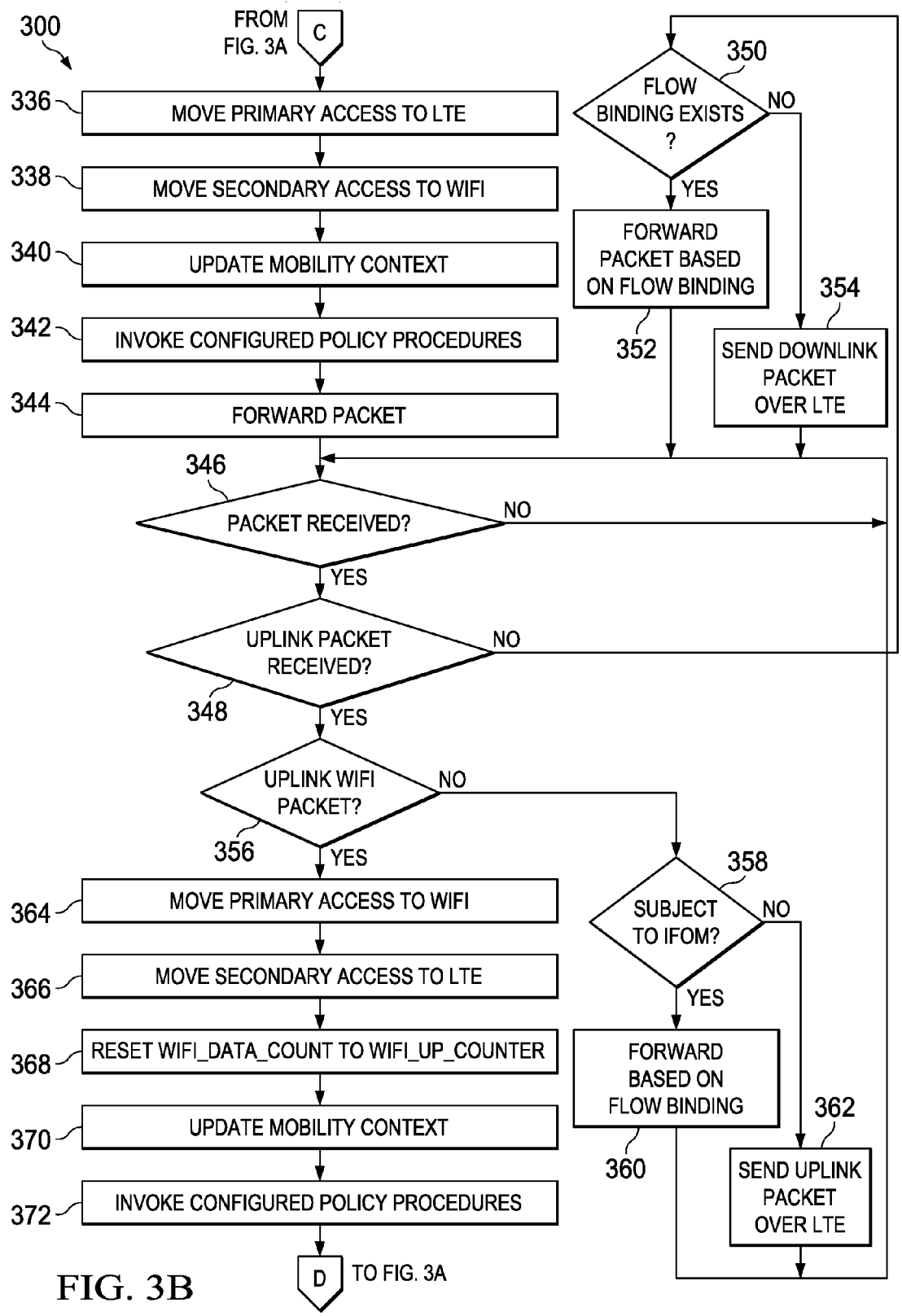

Referring now to FIGS. 3A-3B, FIGS. 3A-3B are a simplified flow diagram 300 illustrating example operations associated with IP flow mobility for robust multiple access network mobility in another example embodiment of communication system 100. In an IP Flow Mobility (IFOM) scenario, an operator may determine to make a Wi-Fi attach IFOM-capable. As previously discussed, this would typically require separate APNs and corresponding PDNs. However, embodiments described herein enable IFOM with the same single APN which results in a single context as discussed in the handover scenario. The APN may be configured in HSS 108 and provided to the trusted Wi-Fi access during UE authentication. The operator may configure flow rules on PGW 112 so that the PGW 112 can route the matching flows over the appropriate interfaces. If IFOM is enabled for the UE's PDN connection, then both LTE and Wi-Fi may act as primary accesses for the traffic that matches the respective flow bindings. In particular embodiments, each of the first access network and second access network may be configured to simultaneously act as a primary access network and second access network depending of a type of packet to be forwarded to the user equipment. Without loss of generality, in one or more embodiments, the type of the packet could be discerned based on the application (such as Youtube, Facebook etc.), the IP packet flow and so on. In one or more embodiments, such as with IP Flow Mobility, a first class of applications are supported over the first access network and a second class of applications are supported over the second access network, and the first class of applications and the second class of application are associated with the same packet data network (PDN) connection. Hence, policy and charging functions may be applied to both the accesses independently for the matching traffic. To address IFOM scenarios, a modification of the procedures described with respect to FIGS. 2A-2B may be implemented in accordance with one or more embodiments.

In 302, PGW 112 sets the primary access to Wi-Fi access for the mobility context associated with UE 102. In 304, PGW 112 sets the secondary access to LTE access for the mobility context associated with UE 102. In 306, PGW 112 defines a new variable referred to as wifi_data_count whose initial value is set to a configurable value=WIFI_UP_COUNTER. In a particular example, WIFI_UP_COUNTER is set to an initial value of 10.

In 308, PGW 112 determines whether a packet has been received. If no packet has been received the operations return to 208. If a packet has been received, the operations continue to 310. In 310, PGW 112 determines whether the received packet is an uplink packet. If the received packet is an uplink packet, the operations continue to 312 in which PGW 112 determines whether the uplink packet is an uplink LTE packet.

If an uplink LTE packet is not received then the received uplink packet is an UL Wi-Fi packet, and PGW 112 resets wifi_data_count back to the initial value of WIFI_UP_COUNTER in 314, the packet is forwarded and operations return to 308. If an UL LTE packet is received, PGW 112 verifies the flow binding to determine whether the packet is subject to IFOM. IF the packet is subject to IFOM, PGW 112 does not decrement wifi_data_count but instead applies any relevant policy in 318, forwards the packet in 320, and updates statistics for LTE usage in 322. If the packet is not subject to IFOM, PGW verifies whether wifi_data_count is greater than zero in 324. If wifi_data_count is greater than zero, it implies that Wi-Fi is working and yet UE 102 choose to send a non-IFOM packet over LTE. As a result, PGW 112 decrements wifi_data_count in 326 and the operations continue to 318. If wifi_data_count is not greater than zero, operations continue to 336 as will be further described.

If it is determined in 310 that the received packet is not an uplink packet then the received packet is a downlink packet and the operations continue to 328. In 328, PGW 112 determines whether wifi_data_count is equal to zero (0). If wifi_data_count is not equal to zero, PGW 112 verifies whether flow binding exists for the packet in 330. If flow binding exists, PGW 112 forwards the packet based on the flow binding in 332. If no flow binding exists, PGW 112 sends the downlink packet over the Wi-Fi access in 334 and the operations return to 308.

If it is determined in 328 that wifi_data_count equals zero, PGW 112 moves the primary access for UE 102 to LTE access in 336. In 338, PGW 112 moves the secondary access for UE 102 to Wi-Fi access. In 340, PGW 112 updates the mobility context for UE 102 to reflect the radio access technology (RAT) Type of primary access of LTE and secondary access of Wi-Fi. In 342, PGW 112 invokes any configured policy procedures for UE 102 such as charging policies or quality of service (QoS) policies. In 344, PGW 112 sends the downlink packet over the LTE access.

In 346, PGW 112 determines whether another packet has been received. If no packet has been received the operations return to 346. If another packet is received, the operations continue to 348 in which PGW 112 determines whether the received packet is an uplink packet. If the received packet is not an uplink packet and is therefore a downlink packet, PGW 112 determines whether flow binding exists for the packet in 350. If flow biding exists, PGW 112 forwards the packet based on the flow binding in 352 and operations return to 346. If no flow binding exists, PGW 112 sends the downlink packet over LTE in 354 and operations return to 346.

If the received packet is an uplink packet, the operations continue to 356 in which PGW 112 determines whether the uplink packet is a Wi-Fi packet. If the uplink packet is not a Wi-Fi packet, PGW 112 determines whether the packet is subject to IFOM in 358. If the packet is subject to IFOM, PGW 112 forwards the packet based upon the flow binding in 360 and the operations return to 346. If the packet is not subject to IFOM, PGW 112 sends the uplink packet over LTE in 362 and operations return to 346.

If the uplink packet is a Wi-Fi packet, PGW 112 moves primary access for UE 102 to Wi-Fi access in 364. In 366, PGW 112 moves secondary access for UE 102 to LTE access. In 368, PGW 112 resets the value of wifi_data_count to the initial value of WIFI_UP_COUNTER. In 370, PGW 112 updates the mobility context for UE 102 to reflect the radio access technology (RAT) Type of primary access of Wi-Fi and secondary access of LTE. In 372, PGW 112 invokes any configured policy procedures for UE 102, forwards the packet, and operations return to 308.

Figure 4:
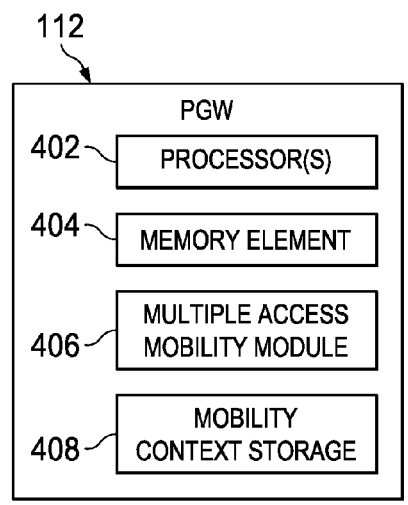
FIG. 4 illustrates an embodiment of packet data network (PDN) gateway (PGW) of communication system.

Referring now to FIG. 4, FIG. 4 illustrates an embodiment of packet data network (PDN) gateway (PGW) 112 of communication system 100. PGW 112 includes one or more processor(s) 402, a memory element 404, a multiple access mobility module 406, and a mobility context storage 408. Processor(s) 402 is configured to execute various tasks of PGW 112 as described herein and memory element 404 is configured to store data associated with PGW 112. Multiple access mobility module 406 is configured to implement the various multiple access network mobility functions as further described herein. Mobility context storage 408 is configured to store a mobility context including a primary access and a second access for one or more user equipment devices such as UE 102 as further described herein.

In one implementation, PGW 112 is a network element that includes software to achieve (or to foster) the multiple access network mobility operations, as outlined herein in this Specification. Note that in one example, each of these elements can have an internal structure (e.g., a processor, a memory element, etc.) to facilitate some of the operations described herein. In other embodiments, these operations may be executed externally to this element, or included in some other network element to achieve this intended functionality. Alternatively, PGW 112 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Referring now to FIG. 5, FIG. 5 is a simplified flow diagram 500 illustrating another example operation of communication system 100 in accordance with another embodiment. In 502, PGW 112 establishes a mobility context associated with user equipment (UE) 102. The mobility context includes a designation of a first radio access network as a primary access and a second radio access network as a secondary access. In a particular embodiment, the first radio access network is a mobile network such as an LTE network. In another particular embodiment, the second radio access network is a wireless local area network (WLAN). In one or more embodiments, primary access is the access over which PGW 112 forwards packets in the downlink (DL) to UE 102 and accepts packets in the uplink (UL) from UE 102, and the secondary access is the access over which PGW 112 only accepts packets in the uplink, but does not forward packets in the downlink. In 504, PGW 112 defines an initial value (for example, a value=WIFI_UP_COUNTER) for a data count variable (for example, wifi_data_count). The data count variable is representative of a number of consecutive uplink packets associated with UE 102 received over the first radio access network.

In 506, PGW 112 receives at least one first uplink packet associated with the user equipment from at least one of the first radio access network and the second radio access network. In 508, PGW 112 determines whether the uplink packet is received over the first radio access network or the second radio access network. When the first uplink packet is received over the second radio access network, PGW 112 modifies a value of the data count variable in 510 and operations continue to 514. In a particular embodiment, modifying the value of the data count variable includes decrementing the value of the data count variable. When the first uplink packet is received over the first radio access network, PGW 112 sets the value of the data count variable to the initial value of the data count variable and operations return to 506.

In 514, PGW 112 determines whether the value of the data count variable is equal to the predetermined value. If the value of the data count variable is not equal to the predetermined value, the operations return to 506. If the value of the data count variable is equal to the predetermined value, PGW 112 modifies the mobility context of UE 102 in 516. In a particular embodiment, modifying the mobility context includes designating the second radio access network as the primary access network for UE 102, and designating the first radio access network as the secondary access network for UE 102.

In 518, PGW 112 receiving a second uplink packet associated with the user equipment from at least one of the first radio access network and the second radio access network. In 520, PGW 112 determines whether the second packet is received over the first radio access network or the second radio access network. In 522, PGW 112 forwards the second uplink packet when the second uplink packet is received over the second radio access network and operations return to 518. When the second uplink packet is received over the first radio access network, PGW 112 further modifies the mobility context of UE 102 and operations return to 506. In a particular embodiment, further modifying the mobility context includes designating the first radio access network as the primary access network for the user equipment, and designating the second radio access network as the secondary access network for the user equipment.

In particular embodiment, PGW 112 may further receiving a downlink packet associated with the user equipment, and forward the downlink packet over the first radio access network when the first radio access network is designated as the primary access. In still another embodiment, PGW 112 may further receive a downlink packet associated with the user equipment, and forward the downlink packet over the second radio access network when the second radio access network is designated as the primary access.

Some particular embodiments may provide one or more of the following advantages: provide for robust LTE-Wi-Fi handovers with a single PDN context, allowing for policy and charging to work without changes to existing infrastructure; provide for IP Flow Mobility with a single APN and PDN connection; and provide for LTE-Wi-Fi handovers without requiring UE modifications.

In regards to the internal structure associated with communication system 100, each of UE 102, LTE eNodeB 104, MME 108, HSS 108, SGW 110, PGW 112, PCRF 114, WLAN AP 118, WLC 120, and WLAN AGW 122 can include memory elements for storing information to be used in achieving the multiple access network mobility operations, as outlined herein. Additionally, each of these devices may include a processor that can execute software or an algorithm to perform the multiple access network mobility activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to UE 102, LTE eNodeB 104, MME 108, HSS 108, SGW 110, PGW 112, PCRF 114, WLAN AP 118, WLC 120, and WLAN AGW 122 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the multiple access network mobility functions outlined herein may be implemented by logic encoded in one or more tangible media, which may be inclusive of non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors could transform an element or an article (e.g., data) from one state or thing to another state or thing. In another example, the multiple access network mobility activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols in which in order to provide hand-in access to a network. Moreover, although communication system 100 has been illustrated with reference to particular elements and operations that facilitate the communication process, these elements and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   establishing a mobility context associated with a user equipment, wherein the mobility context includes a designation of a first radio access network as a primary access network and a second radio access network as a secondary access network;
   defining an initial value for a data count variable, wherein the data count variable is representative of a number of consecutive uplink packets associated with the user equipment received over the first radio access network;
   receiving at least one first uplink packet associated with the user equipment from at least one of the first radio access network and the second radio access network;
   modifying a value of the data count variable when the first uplink packet is received over the second radio access network;
   setting the value of the data count variable to the initial value of the data count variable when the first uplink packet is received over the first radio access network; and
   modifying the mobility context if the value of the data count variable is equal to a predetermined value.

2. The method of claim 1, wherein modifying the mobility context includes:
   designating the second radio access network as the primary access network for the user equipment; and
   designating the first radio access network as the secondary access network for the user equipment.

3. The method of claim 2, further comprising:
   receiving a downlink packet associated with the user equipment; and
   forwarding the downlink packet over the second radio access network when the second radio access network is designated as the primary access.

4. The method of claim 2, further comprising:
   receiving a second uplink packet associated with the user equipment from at least one of the first radio access network and the second radio access network; and
   determining whether the second packet is received over the first radio access network or the second radio access network.

5. The method of claim 4, further comprising forwarding the second uplink packet when the second uplink packet is received over the second radio access network.

6. The method of claim 4, further comprising further modifying the mobility context of the user equipment when the second uplink packet is received over the first radio access network.

7. The method of claim 6, wherein further modifying the mobility context further includes:
   designating the first radio access network as the primary access network for the user equipment; and
   designating the second radio access network as the secondary access network for the user equipment.

8. The method of claim 1, wherein modifying the value of the data count variable includes decrementing the value of the data count variable.

9. The method of claim 1, further comprising:
   receiving a downlink packet associated with the user equipment; and
   forwarding the downlink packet over the first radio access network when the first radio access network is designated as the primary access.

10. The method of claim 1, wherein the second radio access network is a mobile network.

11. The method of claim 10, wherein the mobile network is an LTE network.

12. The method of claim 1, wherein the first radio access network is a wireless local area network (WLAN).

13. The method of claim 1, wherein each of the first access network and second access network are configured to simultaneously act as a primary access network and secondary access network depending on the type of packet to be forwarded to the user equipment.

14. The method of claim 13, wherein a first class of applications are supported over the first access network and a second class of applications are supported over the second access network, wherein the first class of applications and the second class of application are associated with the same packet data network (PDN) connection.

15. One or more non-transitory tangible media encoding logic that include instructions for execution that, when executed by a processor, is operable to perform operations comprising:
    establishing a mobility context associated with a user equipment, wherein the mobility context includes a designation of a first radio access network as a primary access network and a second radio access network as a secondary access network;
    defining an initial value for a data count variable, wherein the data count variable is representative of a number of consecutive uplink packets associated with the user equipment received over the first radio access network;
    receiving at least one first uplink packet associated with the user equipment from at least one of the first radio access network and the second radio access network;
    modifying a value of the data count variable when the first uplink packet is received over the second radio access network;
    setting the value of the data count variable to the initial value of the data count variable when the first uplink packet is received over the first radio access network; and
    modifying the mobility context if the value of the data count variable is equal to a predetermined value.

16. The media of claim 15, wherein modifying the mobility context includes:
    designating the second radio access network as the primary access network for the user equipment; and
    designating the first radio access network as the secondary access network for the user equipment.

17. The media of claim 15, wherein the operations further comprise:
    receiving a second uplink packet associated with the user equipment from at least one of the first radio access network and the second radio access network; and
    determining whether the second packet is received over the first radio access network or the second radio access network.

18. The media of claim 17, wherein the operations further comprise further modifying the mobility context of the user equipment when the second uplink packet is received over the first radio access network.

19. The media of claim 18, wherein further modifying the mobility context further includes:
    designating the first radio access network as the primary access network for the user equipment; and
    designating the second radio access network as the secondary access network for the user equipment.

20. The media of claim 15, wherein modifying the value of the data count variable includes decrementing the value of the data count variable.

21. An apparatus, comprising:
    a memory element for storing data; and
    a processor that executes instructions associated with the data, wherein the processor and memory element cooperate such that the apparatus is configured for:
        establishing a mobility context associated with a user equipment, wherein the mobility context includes a designation of a first radio access network as a primary access network and a second radio access network as a secondary access network;
        defining an initial value for a data count variable, wherein the data count variable is representative of a number of consecutive uplink packets associated with the user equipment received over the first radio access network;
        receiving at least one first uplink packet associated with the user equipment from at least one of the first radio access network and the second radio access network;
        modifying a value of the data count variable when the first uplink packet is received over the second radio access network;
        setting the value of the data count variable to the initial value of the data count variable when the first uplink packet is received over the first radio access network; and
        modifying the mobility context if the value of the data count variable is equal to a predetermined value.

22. The apparatus of claim 21, wherein modifying the mobility context includes:
    designating the second radio access network as the primary access network for the user equipment; and
    designating the first radio access network as the secondary access network for the user equipment.

* * * * *